United States Patent Office 2,921,959
Patented Jan. 19, 1960

2,921,959

PROCESS OF RESOLVING DL-SERINE

Gaston Amiard, Noisy-le-Sec, René Heymes, Romainville, and Léon Velluz, Paris, France, assignors to UCLAF, Paris, France, a body corporate of France No Drawing. Application May 3, 1955
Serial No. 505,832

Claims priority, application France May 20, 1954

12 Claims. (Cl. 260—534)

The present invention relates to a process of resolving DL-serine into its optically active components and to new and valuable optically active salts of said serine.

Serine corresponds to the following Formula I

I

The racemic or DL-serine is a mixture of equal proportions of L-serine and of its enantiomorphic form, the D-serine.

Serine is a β-hydroxyl substituted α-amino acid which, in its levorotatory form, i.e. as L-serine, plays an important role in animal metabolism. Serine, in its D- and L-forms, is also a component of various polypeptides. It is found, for instance, in its D-form in certain polymyxines and in its L-form in viomycin, hypertensin, azaserine and numerous polypeptides of various origin.

Known synthetic methods of producing serine yield the racemic mixture of the two optically active forms of said amino acid. To utilized said racemic amino acid, it is necessary to resolve the racemic mixture into its optically active components which can then be employed, for instance, in the synthesis of polypeptides containing said amino acids.

The only heretofore known method of resolving DL-serine makes use of the formation of the quinine salt of N-p-nitro benzoyl D-serine and of the brucine salt of N-p-nitro benzoyl L-serine as intermediates in the resolving process. This known process, however, is quite burdensome and difficult in execution.

It is one object of the present invention to overcome the disadvantages encountered heretofore in resolving DL-serine and to provide a simple and effective resolving process, thereby producing the D- and the L-forms in a remarkably good yield and purity.

Another object of the present invention consists in providing new and valuable derivatives of serine and its optically active forms which derivatives are useful as intermediates in the resolution of said amino acid by the process according to the present invention.

Other objects of the present invention and advantageous features thereof will become apparent as the description proceeds.

In principle, the process according to the present invention uses as starting material DL-serine in the form of its N-3,5-dinitro benzoyl derivative corresponding to the following Formula II

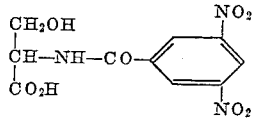

II

Said N-3,5-dinitro benzoyl-DL-serine is dissolved in an organic solvent and preferably in a lower aliphatic alcohol, for instance, in methanol. To said solution there is added L(+)-threo-(1-p-nitrophenyl)-2-amino propane-1,3-diol in an amount preferably corresponding to half the molecular amount. Thereby, preferred formation of the salt of N-3,5-dinitro benzoyl-L-serine and L(+)-threo-(1-p-nitro phenyl)-2-amino propane-1,3-diol takes place. Said salt is only slightly soluble in the respective solvent and precipitates in the crystalline state. The yield of said salt can be improved by adding to the reaction mixture varying amounts of a water-immiscible solvent, such as acetic acid ethyl ester or ether.

In contrast thereto, N-3,5-dinitro benzoyl-D-serine forms a slightly soluble salt preferably with D(−)-threo-(1-p-nitro phenyl)-2-amino propane-1,3-diol.

The crystalline precipitates obtained in this manner and consisting of the optically active salts of the two reaction components are treated with an alkaline agent, thereby causing splitting off of the resolving agent which can be recovered almost quantitatively. After removing the insoluble resolving agent, the resulting alkaline metal salt solution is acidified to yield the optically active forms of N-3,5-dinitro benzoyl serine. Acid hydrolysis of said optically active compounds produces the corresponding optically active serine. It is a surprising feature of the present process that thereby no appreciable racemization takes place.

The mother liquors remaining after precipitation and separation of the optically active salts of low solubility are worked up in a similar manner, i.e. by splitting off the resolving agent by alkaline hydrolysis, separating the resolving agent recovered thereby, acidifying the resulting alkaline solution and subjecting the N-3,5-dinitro benzoyl serine compound to acid hydrolysis to produce the other enantiomorphic form of said amino acid. The optically active N-3,5-trinitro benzoyl serine obtained in this manner from the mother liquor is usually contaminated by small amounts of the racemic acylated serine. Said enantiomorphic compound can readily be purified by recrystallization from a suitable solvent. In cases where more thorough purification is required, the impure product is precipitated by reaction with the corresponding threo-(1-p-nitro phenyl)-2-amino propane-1,3-diol. It is also possible to convert said impure product directly into the racemic mixture by processes known per se. Another way of racemizing said impure product consists in first producing free serine therefrom and subjecting said free serine to a treatment with an alkaline agent according to the procedure described by Crawhall and Elliott in "Biochemical Journal," vol. 48 (1951), page 237. The resulting racemic mixture is again subjected to the resolving process according to the present invention. By alternative resolution and racemization it is possible to convert all of the originally present racemic mixture into the desired enantiomorphic compound.

The D(−)- or L(+)-threo-1-(p-nitro phenyl)-2-amino propane-1,3-diol used as resolving agents for salt formation with the optically active components of N-3,5-dinitro benzoyl-DL-serine are obtained as intermediates in the synthesis of chloramphenicol and preferably by the resolving process disclosed by Velluz, Amiard, and Joly in Bull. Soc. Chim., 1953, page 342. Said compounds correspond to the following Formula III and have the following characteristic properties.

D(−)-threo-1-(p-nitro phenyl)-2-amino propane-1,3-diol: Melting point: 162–163° C.; rotatory power $[\alpha]_D = -28° \pm 2°$ (concentration 2% in 0.1 N hydrochloric acid).

L(+)-threo-1-(p-nitro phenyl)-2-amino propane-1,3-diol: Melting point: 162–163° C.; rotatory power $[\alpha]_D$ = +28°±2° (concentration 2% in 0.1 N hydrochloric acid).

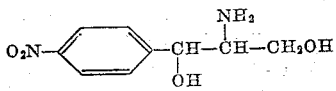

III

The following examples serve to illustrate the present invention without, however, limiting the same thereto. For instance, it is possible to produce N-3,5-dinitro benzoyl-DL-serine by any other method known to the art or by reacting 3,5-dinitro benzoylchloride with an ester, an ether, or another derivative of serine from which the N-acylated amino acid can readily be regenerated.

It is also possible to vary the nature of the solvent, the temperatures during dissolution and crystallization, the time required for cooling, and other measures taken in the preparation of salts of D(—)- or L(+)-threo-1-p-nitro phenyl-2-amino propane-1,3-diol with the respective optically active serine compounds, without departing from the principle of this invention as set forth in the specification and in the claims annexed hereto.

EXAMPLE 1

*Preparation of N-3,5-dinitro benzoyl-DL-serine*

6.3 g. of DL-serine are dissolved in 60 cc. of N sodium hydroxide solution. The solution is cooled and 6.9 g. of 3,5-dinitro benzoylchloride are added thereto. 10 g. of 3,5-dinitro benzoylchloride are additionally introduced into the reaction mixture whereby said mixture is rendered alkaline by the addition of 75 cc. of N sodium hydroxide solution. 15 cc. of hydrochloric acid are then added, the mixture is cooled, filtered, washed with ether in order to eliminate dinitro benzoic acid, and dried. In this manner, 16.7 g. of N-3,5-dinitro benzoyl-DL-serine corresponding to a yield of 93% of the theoretical yield are obtained. The monohydrate of said acylated compound melts, on the Maquenne block, at 100–101° C.

EXAMPLE 2

*Resolution of N-3,5-dinitro benzoyl-DL-serine and preparation of D- and L-serine*

(a) FORMATION OF THE SALT OF N-3,5-DINITRO BENZOYL-L-SERINE WITH L(+)-THREO-1-(P-NITRO PHENYL)-2-AMINO PROPANE-1,3-DIOL

*Process I.*—10 g. of N-3,5-dinitro benzoyl-DL-serine, obtained according to Example 1 are dissolved at 60° C. in 30 cc. of methanol. 4.2 g. of L(+)-threo-1-p-nitro phenyl-2-amino propane-1,3-diol are added to said solution. The reaction mixture is cooled to 10° C. Thereby 6.8 g. of the optically pure salt of N-3,5-dinitro benzoyl-L-serine with L(+)-threo-1-(p-nitro phenyl)-2-amino propane-1,3-diol are obtained. The yield amounts to 80% of the theoretical yield. The melting point of the new salt is 160–161° C., its rotatory power is $[\alpha]_D = +33°$ ±1° (concentration: 1% in water).

*Process II.*—10 g. of N-3,5-dinitro benzoyl-DL-serine are dissolved at 60° C. in 5 cc. of methanol. 4.2 g. of L(+)-threo-1-p-nitro phenyl-2-amino propane-1,3-diol are added thereto. 55 cc. of acetic acid ethyl ester are then introduced into the resulting reaction mixture. The mixture is cooled. The precipitated salt is filtered off, washed, and dried. In this manner 8.2 g. of the optically pure salt of N-3,5-dinitro benzoyl-L-serine and L(+)-threo-1-(p-nitro phenyl)-2-amino propane-1,3-diol are obtained thereby. The yield amounts to 96% of the theoretical yield.

(b) PREPARATION OF N-3,5-DINITRO BENZOYL-L-SERINE 8.2 g. of the above mentioned salt are dissolved in 16.5 cc. of N sodium hydroxide solution. Thereby L(+)-threo-1-(p-nitro phenyl)-2-amino propane-1,3-diol is split off in crystalline form. The crystals are filtered off and washed. In this manner 3.1 g. of the resolving agent, corresponding to 74% of the theoretical yield, are recovered.

The filtrate is acidified by means of 1.7 cc. of concentrated hydrochloric acid. Thereby N-3,5-dinitro benzoyl-L-serine crystallizes. It is filtered off, washed, and dried. 4.5 g. of N-3,5-dinitro benzoyl-L-serine are obtained in crystalline form. The yield amounts to 90% based upon N-3,5-dinitro benzoyl-DL-serine used as starting material. The monohydrate of said compound has a melting point of 110–112° C. Its rotatory power is $[\alpha]_D^{20} = +23.5°$ ±1° (concentration: 1% in 50% ethanol).

(c) ISOLATION OF L-SERINE

A solution of 4.3 g. of N-3,5-dinitro benzoyl-L-serine in 60 cc. of 5 N hydrochloric acid is heated under reflux for one hour. The resulting solution, after filtration, is evaporated to dryness in a vacuum. The remaining hydrochloride of L-serine is recrystallized from acetone and is dissolved in 1 cc. of water. 1.4 cc. of aniline and thereafter 10 cc. of absolute ethanol are added to said solution. On cooling, 1.3 g. of optically pure crystalline L-serine are obtained. The yield amounts to 90% of the theoretical yield. The melting point of said optically active L-serine is about 228° C. Its rotatory power $[\alpha]_D = +15°$ ±1° (concentration: 4% in N hydrochloric acid).

(d) ISOLATION OF D-SERINE

The acetic acid ethyl ester-methanol mother liquor obtained after removing the crystallized salt of N-3,5-dinitro benzoyl-L-serine and of L(+)-thero-1-(p-nitro phenyl)-2-amino propane-1,3-diol obtained according to Example 2a, Process II, as described hereinabove, is extracted first with 10 cc. of 0.5 N hydrochloric acid and then with 5 cc. of water. The aqueous solutions are combined and are then rendered alkaline by the addition of sodium hydroxide solution. In this manner 0.4 g. of the resolving agent, corresponding to 10% of the theoretical yield, are recovered by filtration. The organic phase is concentrated and petroleum ether is added thereto. Thereby 4.85 g. of N-3,5-dinitro benzoyl-D-serine corresponding to 97% calculated for N-3,5-dinitro benzoyl-DL-serine used as starting material, are isolated. Said compound can readily be purified by recrystallization from aqueous ethanol 1:1. The crude compound melts at 109–111° C., its rotatory power is $[\alpha]_D^{20} = -22°$ ±1° (concentration: 1% in 50% ethanol).

D-serine is obtained from said N-acyl compound in the same manner as described hereinabove under (c) for the preparation of L-serine by hydrolyzing N-3,5-dinitro benzoyl-D-serine by means of hydrochloric acid.

EXAMPLE 3

*Preparation of N-3,5-dinitro benzoyl-D-serine by means of D(—)-threo-1-p-nitro phenyl-2-amino propane-1,3-diol*

The procedure is the same as described hereinabove in Example 2a, whereby D(—)-threo-1-p-nitro phenyl-2-amino propane-1,3-diol is reacted with N-3,5-dinitro benzoyl-DL-serine. Thereby the salt of N-3,5-dinitro benzoyl-D-serine with D(—)-threo-1-p-nitro phenyl-2-amino propane-1,3-diol is obtained. The melting point of said new compound is 160–161° C.; its rotatory power is $[\alpha]_D^{20} = -33°$ ±1° (concentration: 1% in water). Said salt is converted, by following the same procedure as described hereinabove in Example 2b, into optically pure N-3,5-dinitro benzoyl-D-serine. The monohydrate of said compound has a melting point of 110–112° C. Its rotary power is $[\alpha]_D = -23.5°$ ±1° (concentration: 1% in 50% ethanol). D-serine is obtained from said N-acylated compound by following the procedure described hereinabove in Example 2c. Said D-serine has a rotary power $[\alpha]_D = -15°$ ±1° (concentration: 4% in N hydrochloric acid).

Although a lower aliphatic alcohol such as methanol is the preferred solvent in the resolving process according to the present invention, it is also possible to use other solvents, provided one of the salts of the enantiomorphic components of N-3,5-dinitro benzoyl-DL-serine is substantially insoluble therein while the other salt of the enantiomorphic component remains dissolved therein.

The elevated temperature at which the optically active threo-1-(p-nitro phenyl)-2-amino propane-1,3-diol is added to the solution of the racemic mixture is preferably at about 60° C. and should not substantially exceed about 100° C. The reaction mixture is then preferably cooled to a temperature of at least about 10° C. The crystallization temperature preferably does not exceed about 50° C.

The concentration of N-acylated-DL-serine in the starting solution is preferably between about 25% and about 40% when using methanol as solvent. The concentration is, of course, dependent upon the solvent employed and optimum conditions can readily be determined for each solvent and each resolving component by simple preliminary experiments.

As alkaline agent for decomposing the salts of optically active N-3,5-dinitro benzoyl-serine with optically active threo-1-(p-nitro phenyl)-2-amino propane-1,3-diol and for recovering the resolving agent, there is preferably employed an alkali hydroxide solution.

Hydrolysis of optically active N-3,5-dinitro benzoyl serine to the corresponding optically active serine is preferably effected by heating under reflux with a mineral acid and especially with 5 N hydrochloric acid.

Of course, many changes and variations in the preparation of the salts of optically active N-3,5-dinitro benzoyl serine with D(—)- or L(+)-threo-1-(p-nitro phenyl)-2-amino propane-1,3-diol, the solvents used, the reaction conditions, temperature, and duration of the dissolution, crystallization, and cooling steps, the recovery of the precipitated and crystallized salts of the optically active components of the racemic starting material and their recrystallization and purification, the decomposition of the resulting salts to produce optically active N-3,5-dinitro benzoyl serine, the hydrolysis of said optically active compounds and the isolation of optically active serine, the recovery of the resolving agent, the reconversion of the undesired optically active serine into the corresponding racemic mixture, and the like, may be made by those skilled in the art in accordance with the principles set forth herein and in the claims annexed hereto.

We claim:

1. In a process of resolving DL-serine, the steps comprising adding a substantially semimolecular amount of L(+)-threo-1-(p-nitro phenyl)-2-amino propane-1,3-diol at elevated temperature not substantially exceeding about 100° C. to a solution of N-3,5-dinitro benzoyl-DL-serine in a solvent wherein the salt of N-3,5-dinitro benzoyl-L-serine with said L(+)-threo-1-(p-nitro phenyl)-2-amino propane-1,3-diol is substantially insoluble, cooling the resulting solution to crystallization temperature, separating the precipitated salt of N-3,5-dinitro benzoyl-L-serine with said L(+)-threo-1-(p-nitro phenyl)-2-amino propane-1,3-diol from the mother liquor, converting said precipitated salt by reaction with an alkaline agent into the alkali metal salt of said N-3,5-dinitro benzoyl-L-serine, acidifying said alkali metal salt, and hydrolyzing the resulting N-3,5-dinitro benzoyl-L-serine to the corresponding L-serine.

2. In a process according to claim 1, wherein the solvent is a lower aliphatic alcohol.

3. In a process according to claim 2, wherein the lower aliphatic alcohol is methanol.

4. In a process of resolving DL-serine, the steps comprising adding a substantially semimolecular amount of L(+)-threo-1-(p-nitro phenyl-2-amino propane-1,3-diol at elevated temperature not substantially exceeding about 100° C. to a solution of N-3,5-dinitro benzoyl-DL-serine in a water-miscible solvent wherein the salt of N-3,5-dinitro benzoyl-L-serine with said L(+)-threo-1-(p-nitro phenyl)-2-amino propane-1,3-diol is substantially insoluble, adding to said solution at said temperature a water-immiscible solvent, cooling the resulting solution to crystallization temperature, separating the precipitated salt of N-3,5-dinitro benzoyl-L-serine with said L(+)-threo-1-(p-nitro phenyl)-2-amino propane-1,3-diol from the mother liquor, converting said precipitated salt by reaction with an alkaline agent into the alkali metal salt of said N-3,5-dinitro benzoyl-L-serine, acidifying said alkali metal salt, and hydrolyzing the resulting N-3,5-dinitro benzoyl-L-serine to the corresponding L-serine.

5. In a process according to claim 4, wherein the water-miscible solvent is methanol, and the water-immiscible solvent is acetic acid ethyl ester.

6. In a process according to claim 5, wherein at least nine parts by volume of acetic acid ethyl ester are added to one part by volume of methanol.

7. In a process of resolving DL-serine, the steps comprising adding a substantially semimolecular amount of L(+)-threo-1-(p-nitro phenyl)-2-amino propane-1,3-diol at elevated temperature not substantially exceeding about 100° C. to a solution of N-3,5-dinitro benzoyl-DL-serine in a solvent in which the salt of N-3,5-dinitro benzoyl-L-serine with said L(+)-threo-1-(p-nitro phenyl)-2-amino propane-1,3-diol is substantially insoluble, cooling the resulting solution to crystallization temperature, separating the precipitated salt of N-3,5-dinitro benzoyl-L-serine with L(+)-threo-1-(p-nitro phenyl)-2-amino propane-1,3-diol from the mother liquor, adding to said mother liquor an alkaline agent, removing the precipitated L(+)-threo-1-(p-nitro phenyl)-2-amino propane-1,3-diol split off thereby, acidifying the remaining mother liquor, and hydrolyzing the resulting N-3,5-dinitro benzoyl-D-serine to form D-serine.

8. In a process of resolving DL-serine, the steps comprising adding a substantially semimolecular amount of L(+)-threo-1-(p-nitro phenyl)-2-amino propane-1,3-diol to a warm solution of N-3,5-dinitro benzoyl-DL-serine in methanol, adding nine parts by volume of acetic acid ethyl ester to the reaction mixture, cooling the resulting mixture to crystallization temperature, separating the precipitated salt of N-3,5-dinitro benzoyl-L-serine with said L(+)-threo-1-(p-nitro phenyl)-2-amino propane-1,3-diol from the mother liquor, converting said precipitated salt of said N-3,5-dinitro benzoyl-L-serine, acidifying said alkali metal salt, and hydrolyzing the resulting N-3,5-dinitro benzoyl-L-serine to the corresponding L-serine.

9. In a process of resolving DL-serine, the steps comprising adding a substantially semimolecular amount of D(—)-threo-1-(p-nitro phenyl)-2-amino propane-1,3-diol at elevated temperature not substantially exceeding 100° C. to a solution of N-3,5-dinitro benzoyl-DL-serine in a solvent in which the salt of N-3,5-dinitro benzoyl-D-serine with said D(—)-threo-1-(p-nitro phenyl)-2-amino propane-1,3-diol is substantially insoluble, cooling the resulting solution to crystallization temperature, separating the precipitated salt of N-3,5-dinitro benzoyl-D-serine with said D(—)-threo-1-(p-nitro phenyl)-2-amino propane-1,3-diol from the mother liquor, converting said precipitated salt by reaction with an alkaline agent into the alkali metal salt of said N-3,5-dinitro benzoyl-D-serine, acidifying said alkali metal salt and hydrolyzing the resulting N-3,5-dinitro benzoyl-D-serine to the corresponding D-serine.

10. In a process according to claim 9, wherein the solvent is methanol.

11. In a process according to claim 9, wherein the solvent is methanol and wherein acetic acid ethyl ester is added to the reaction mixture in an amount being at least nine times as large as that of the methanol present in said methanolic solution.

12. In a process of resolving DL-serine, the steps comprising adding a substantially semimolecular amount of an optically active threo-1-(p-nitro phenyl)-2-amino propane-1,3-diol at elevated temperature not substantially exceeding about 100° C. to a solution of N-3,5-dinitro benzoyl-DL-serine in a solvent wherein the salt of one of the optically active N-3,5-dinitro benzoyl serine compounds with said optically active threo-1-(p-nitro phenyl)-

2-amino propane-1,3-diol is substantially insoluble, cooling the resulting solution to crystallization temperature, separating the precipitated salt of one of the optically active N-3,5-dinitro benzoyl serine compounds with said optically active threo-1-(p-nitro phenyl)-2-amino propane-1,3-diol from the mother liquor, converting said precipitated salt by reaction with an alkaline agent into the alkali metal salt of said optically active N-3,5-dinitro benzoyl serine, acidifying said alkali metal salt, and hydrolyzing the resulting optically active N-3,5-dinitro benzoyl serine to the corresponding optically active serine.

References Cited in the file of this patent

UNITED STATES PATENTS 2,514,377  Crooks et al. _____ July 11, 1950

FOREIGN PATENTS 707,903  Great Britain _____ Apr. 28, 1954

OTHER REFERENCES

Town: Biochem. J. 35 (1941), 578–87.
Greenberg: "Amino Acids," 1951, pp. 223–225.